United States Patent
Jagannathan

(10) Patent No.: US 11,196,612 B2
(45) Date of Patent: Dec. 7, 2021

(54) PARALLEL DISTRIBUTED NETWORKING

(71) Applicant: Virtual Instruments Worldwide, Inc., San Jose, CA (US)

(72) Inventor: Rangaswamy Jagannathan, Sunnyvale, CA (US)

(73) Assignee: Virtual Instruments Worldwide, Inc., San Jose, CA (US)

( * ) Notice: Subject to any disclaimer, the term of this patent is extended or adjusted under 35 U.S.C. 154(b) by 0 days.

(21) Appl. No.: 16/236,297

(22) Filed: Dec. 28, 2018

(65) Prior Publication Data

US 2020/0304363 A1 Sep. 24, 2020

Related U.S. Application Data

(60) Provisional application No. 62/612,429, filed on Dec. 30, 2017.

(51) Int. Cl.
*H04L 12/24* (2006.01)
*H04L 12/26* (2006.01)

(52) U.S. Cl.
CPC ........ *H04L 41/042* (2013.01); *H04L 41/0604* (2013.01); *H04L 43/022* (2013.01); *H04L 43/12* (2013.01)

(58) Field of Classification Search
CPC .............. H04L 41/042; H04L 41/0604; H04L 41/0631; H04L 43/022; H04L 43/08; H04L 43/12
See application file for complete search history.

(56) References Cited

U.S. PATENT DOCUMENTS

| | | | |
|---|---|---|---|
| 8,199,641 B1 * | 6/2012 | Jagannathan | H04L 43/026 370/229 |
| 10,348,549 B1 * | 7/2019 | Jagannathan | H04L 43/16 |
| 2006/0280207 A1 * | 12/2006 | Guarini | H04L 41/0853 370/524 |
| 2010/0094981 A1 * | 4/2010 | Cordray | H04L 41/20 709/222 |
| 2015/0358391 A1 * | 12/2015 | Moon | G06F 11/3409 709/224 |
| 2016/0342899 A1 * | 11/2016 | Kabiljo | G06N 20/00 |
| 2016/0380892 A1 * | 12/2016 | Mahadevan | H04L 45/02 370/389 |

\* cited by examiner

*Primary Examiner* — Ario Etienne
*Assistant Examiner* — Kamal Hossain
(74) *Attorney, Agent, or Firm* — Ahmann Kloke LLP

(57) ABSTRACT

Computing devices, each of which monitors information in a monitoring environment, take on the role of a controller for some of them, separating the (real or virtual) elements of the environment into subsets. Computing devices provide their results to a unification device, which combines them into a monitoring parameter. Each computing device monitors its parameters based on a timestamp, so unification devices can determine whether results from those computing devices represent the same state of the environment. Unification devices divide the results from their computing devices into uniform durations. Even if results don't reflect the same environment state, unification devices can still approximate results for unification. Elements can be reassigned on time boundaries, or can be duplicated, with unification devices still able to unify results. Predicted queries can be pre-computed.

17 Claims, 2 Drawing Sheets

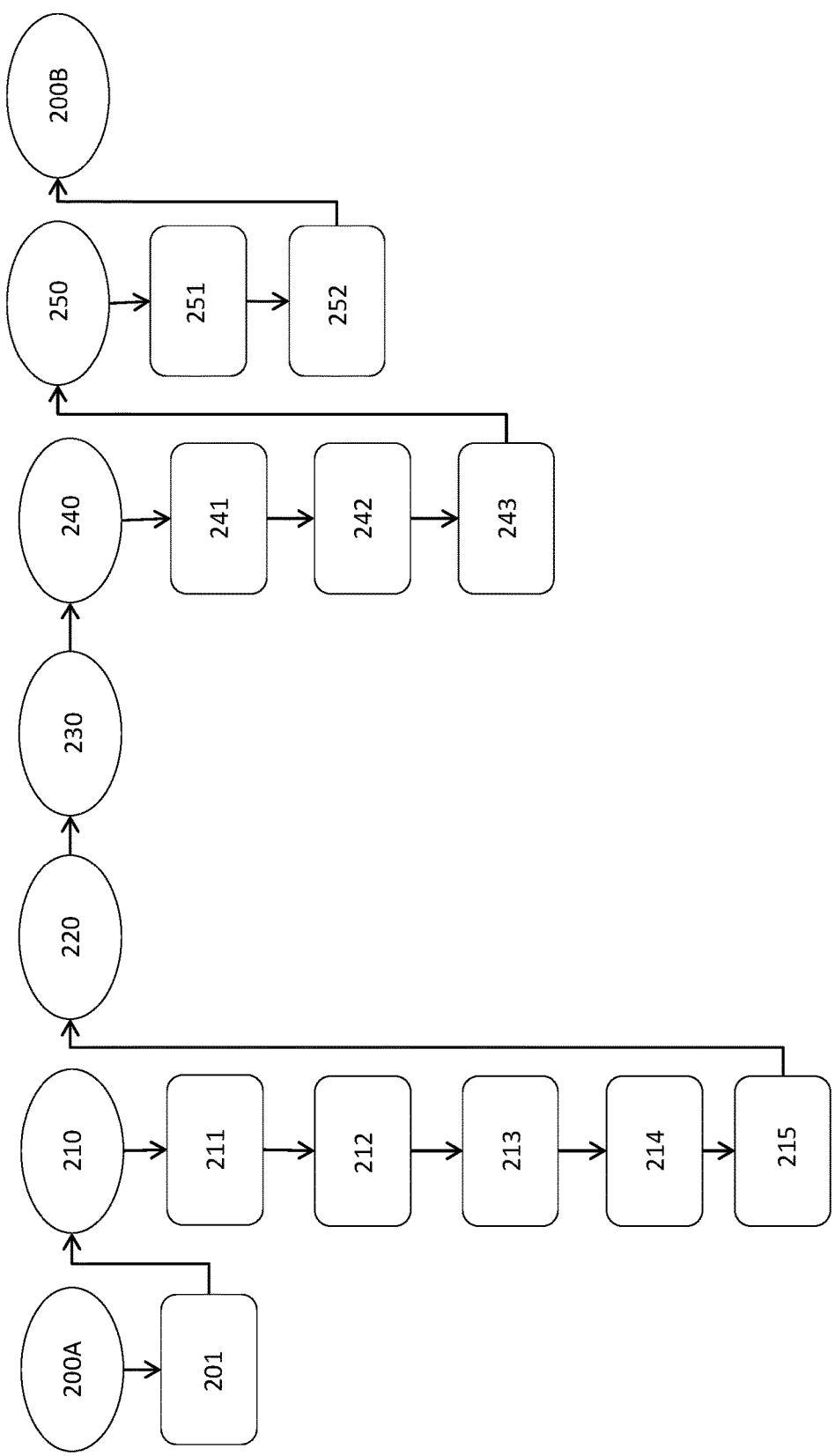

PARALLEL DISTRIBUTED NETWORKING

INCORPORATED DISCLOSURES

This Application claims priority of the following provisional application:

U.S. Provisional Application No. 62/612,429, filed Dec. 30, 2017, in the name of inventor Rangaswamy JAGANNATHAN, titled "Parallel Distributed Networking", hereby incorporated by reference as if fully set forth herein.

This Application describes technologies that can be used with inventions, and other technologies, described in one or more of the following documents. These documents are sometimes referred to herein as the "Included Disclosures," the "Incorporated Documents," or variants thereof.

Application Ser. No. 15/946,092; filed Apr. 5, 2018; in the name of inventors Derek SANDERS, Rangaswamy JAGANNATHAN, Rosanna LEE, Kishor KAKATAR, and Xiaohong PAN; titled "Network Monitoring Using Behavior Probability Density, Network Monitoring of Multiple Observation Values Types, and Network Monitoring Using Orthogonal Profiling Dimensions"; hereby incorporated by reference as if fully set forth herein, and assigned to the same Assignee;

Application Ser. No. 12/791,704; filed Jun. 1, 2010; in the name of inventors Kishor KAKATAR, Roy NAKASHIMA, Rosanna LEE, Jing LIU, Derek SANDERS, Rangaswamy JAGANNATHAN, and David MESSINA; titled "Recording, Replay, and Sharing of Live Net-work Monitoring Views"; hereby incorporated by reference as if fully set forth herein, and assigned to the same Assignee;

Application Ser. No. 15/619,425; filed Jun. 9, 2017; in the name of inventors Rosanna LEE, Rangaswamy JAGANNATHAN, and Jing LIU; titled "Push Pull Data Collection"; hereby incorporated by reference as if fully set forth herein, and assigned to the same Assignee;

Application Ser. No. 15/992,141; filed May 29, 2018; in the name of inventors Rosanna LEE, Rangaswamy JAGANNATHAN, and Jing LIU; titled "Cross-Silo Time Stitching"; hereby incorporated by reference as if fully set forth herein, and assigned to the same Assignee;

Application Ser. No. 15/867,685; filed Jan. 10, 2018; in the name of inventors Jing LIU, Rangaswamy JAGANNATHAN, and Rosanna LEE; titled "Enhanced Flow Processing"; hereby incorporated by reference as if fully set forth herein, and assigned to the same Assignee;

Application Ser. No. 15/067,168; filed Mar. 10, 2016; in the name of inventors Derek SANDERS, Rangaswamy JAGANNATHAN, and Rosanna LEE; titled "Self-Learning And Best-Practices Profiling And Alerting With Relative And Absolute Capacity"; hereby incorporated by reference as if fully set forth herein, and assigned to the same Assignee;

Application Ser. No. 15/079,039; filed Mar. 23, 2016; in the name of inventors Derek SANDERS, Jing LIU, and Rangaswamy JAGANNATHAN; titled "Storm Detection, Analysis, and Remediation"; hereby incorporated by reference as if fully set forth herein, and assigned to the same Assignee.

Each and every one of these documents, as well as all documents cited therein, are hereby incorporated by reference as if fully recited herein.

This Application claims priority of each and every one of these documents, to the fullest extent possible.

BACKGROUND

Field of the Disclosure

This Application relates to parallel distributed networking, and related issues.

BACKGROUND

Field of the Invention

This Application can relate to parallel distributed networking. One example might be in a distributed network monitoring environment. Other and further possibilities are described herein.

Related Art

One problem that has arisen, particularly in the field of network monitoring, is that a relatively large amount of information might be available for collection and processing. For example, a distributed network monitoring environment might be responsible for relatively large number of resources, such as between tens of thousands and hundreds of millions, or more, and a relatively large number of parameters for each such resource. When a relatively large amount of information is available, one or more results of monitoring or processing that information might lag behind actual behavior of the distributed network monitoring environment. This can have the possible effect that results of monitoring or processing that information might fail to accurately reflect the current status of the network.

One possibility is to distribute the work required to monitor and process information, using a number of distinct monitoring devices in the distributed network monitoring environment. A first fraction of the information to be processed might be allocated to a first processing device, a second fraction of the information to be processed might be allocated to a second processing device, and so on. While this possibility might generally provide for processing information faster than a single device, it is often subject to the drawback that collecting processed information from the multiple processing devices into a holistic result is difficult or inaccurate.

Some Drawbacks of the Known Art

Each of these issues, either alone or in combination with others (whether mentioned herein or otherwise), at some times, or in some conditions, can cause one or more problems with respect to the field of the invention, or related fields.

BRIEF SUMMARY

This Application

This Application provides patentable subject matter that can ameliorate at least some of the problems described above, as well as others.

Devices and Methods of Use

A system can include apparatus, such as a distributed set of computing devices, each of which can monitor or process at least a portion of the information in a monitoring environment (such as a distributed network monitoring environment). Substantially each one of these devices can take on the role of a controller for some subset of these devices (possibly including other ones of the same devices), with the effect that the other devices in that set operate under supervision of that controller.

In one possible implementation, the system separates the elements of the monitoring environment into distinct subsets thereof, with the effect that each element is assigned to a specific one of those computing devices, each assigned to its particular subset of elements. This can apply whether the elements to be monitored or processed are real (such as network bandwidth, physical storage, or processing time) or virtual (such as VMs, VMIs, or VMCIs). Those computing devices provide the results of their monitoring or processing operations to a single unification device (or a relatively small number thereof), which can perform operations to combine those results into a single monitoring parameter (or a relatively small number thereof).

As described in this Application, a system can include computing devices, controllers, unification devices, and reporting devices, that respectively (1) monitor or process at least a portion of the information in the monitoring environment, (2) allocate or distribute that information among those computing devices, and control those computing devices when monitoring or processing that information, (3) unify results of monitoring or processing of that information, (4) report on unification of those results, or some combination or conjunction thereof, or otherwise. As described in this Application, those computing devices, controllers, unification devices, and reporting devices; can be combined, with the effect that at least some devices can perform the functions of two or more thereof; or can be separated, with the effect that at least some of those functions can be performed by two or more devices. As described in this Application, any one or more of those computing devices, controllers, unification devices, and reporting devices; can include real devices, such as real computing devices, virtual devices, such as VMs, or combinations or conjunctions thereof; or otherwise.

In one possible implementation, each controller can allocate computing devices to each resource or parameter in response to an element in the monitoring environment at which the resource or parameter is sent or received. For some examples, (1) network bandwidth can be measured in response to which elements send or receive messages that consume that network bandwidth; (2) processor usage can be measured in response to which elements provide or consume processing cycles; (3) storage can be measured in response to which elements occupy that storage with files or data, or some combination or conjunction thereof, or otherwise.

In one possible implementation, each computing device can monitor or process its assigned parameters in response to a timestamp, or other substantially unique identifier, with the effect that unification devices can determine whether results from those computing devices represent the same (or substantially similar) state of the monitoring environment. For example, when computing devices report their results in the form $\{timestamp\ t_\alpha, value\ v_\alpha\}$, unification devices can determine, in response to the timestamp indicators, what states of the monitoring environment that the computing devices are reporting.

In one possible implementation, unification devices can also divide the reported results from their assigned computing devices into time durations of substantially uniform size. This can have the effect that, even if the reported results do not reflect the same state of the monitoring environment, the unification devices can approximate results for use in unifying those results.

For example,
if a first computing device reports results for network usage of $\{timestamp\ t_{1:01}$, value "30 octets"$\}$, $\{timestamp\ t_{1:31}$, value "30 more octets"$\}$; and a second computing device reports results for $\{timestamp\ t_{1:02}$, value "60 octets"$\}$, $\{timestamp\ t_{1:32}$, value "60 more octets"$\}$;
the unification device associated with those computing devices can divide the first computing device's results into 1 octet per second, divide the second computing device's results into 2 octets per second; and
the unification device can conclude that from the end of timestamp $t_{1:02}$ to the beginning of timestamp $t_{1:31}$ (the time overlap between the two reports, i.e., 29 seconds), the average network usage was 1.5 octets per second.

Similarly,
the unification device can conclude that from the end of timestamp $t_{1:02}$ to the beginning of timestamp $t_{1:31}$ (the time overlap between the two reports, i.e., 29 seconds), the total network usage was 3 octets per second.

As described in this Application, assignment to computing devices of elements in the monitoring environment can be performed relatively statically. This can have the effect that computing devices are assigned substantially the same elements over a relatively longer time duration, where "relatively longer" can be responsive to a noted rate of change in the monitoring environment. For example, if the monitoring environment includes elements that operate with substantially more slowly changing amounts of resource production and usage, there might be no particular need to re-assign elements between computing devices after any particular time duration. This would likely remain so unless urgent or otherwise emergent changes were to be noted by the unification devices. In relative contrast, if the monitoring environment includes elements that operate with substantially more quickly changing amounts of resource production and usage, there might be a readily identifiable need to re-assign elements between computing dell vices after even a relatively short time duration. This would likely be particularly so if urgent or otherwise emergent changes were to be noted by the unification devices.

This Application primarily describes re-assignment of elements in the monitoring environment on relatively well-defined time duration boundaries. However, in the context of the invention, there is no particular requirement for any such limitation. Information about the monitoring environment can generally change over time. This can have the effect that information from relatively long ago (a time duration that can be as little as only a few minutes) does not remain crucial or even especially relevant. Accordingly, re-assignment of elements in the monitoring environment can allow for duplication of relatively small amounts of information (which can include a time duration of up to about a minute, or longer if the monitoring environment is relatively static), to be monitored or processed by the computing devices without substantial distortion of their results. This can have the effect that unification devices can substantially safely unify the results from those computing devices, even if there is more overlap than would ordinarily be desirable.

As described in this Application, possible implementations can include division of elements, monitoring and processing of resources and parameters, and unification of results. Each of these procedures might take substantial time relative to operation of the monitoring environment. This can have the effects that (1) division of elements might have to remain relatively static, and (2) unification of results might have to be performed relatively quickly, to prevent overlap of information used for monitoring or processing. Accordingly, in one possible implementation, predicted queries with respect to the monitoring environment (such as queries that have been requested earlier, or queries that are requested for the future by operators or users) are pre-computed. First, computing devices pre-compute their monitoring of resources or processing of their parameters, and present their results to unification devices. Second, unification devices collect results from their associated computing devices, and unify those results into reports in response to predicted queries. This can have the effect that reports in response to predicted queries can be ready for operators and users relatively quickly after information can be collected from the monitoring environment.

Other and further advantages are described herein.

Possible Applicability

After reading this Application, those skilled in the art would recognize that techniques shown herein are applicable to more than just the specific embodiments shown herein, are within the scope and spirit of the invention, and would not require undue experiment or further invention.

Other and further techniques, also shown or suggested by this Application, are also applicable to more than just the specific embodiments described herein.

BRIEF DESCRIPTION OF THE DRAWINGS

FIG. 2 shows a conceptual drawing of a method.

DETAILED DESCRIPTION OF AN EMBODIMENT

Terminology

Generality of the Description

Figure 1:
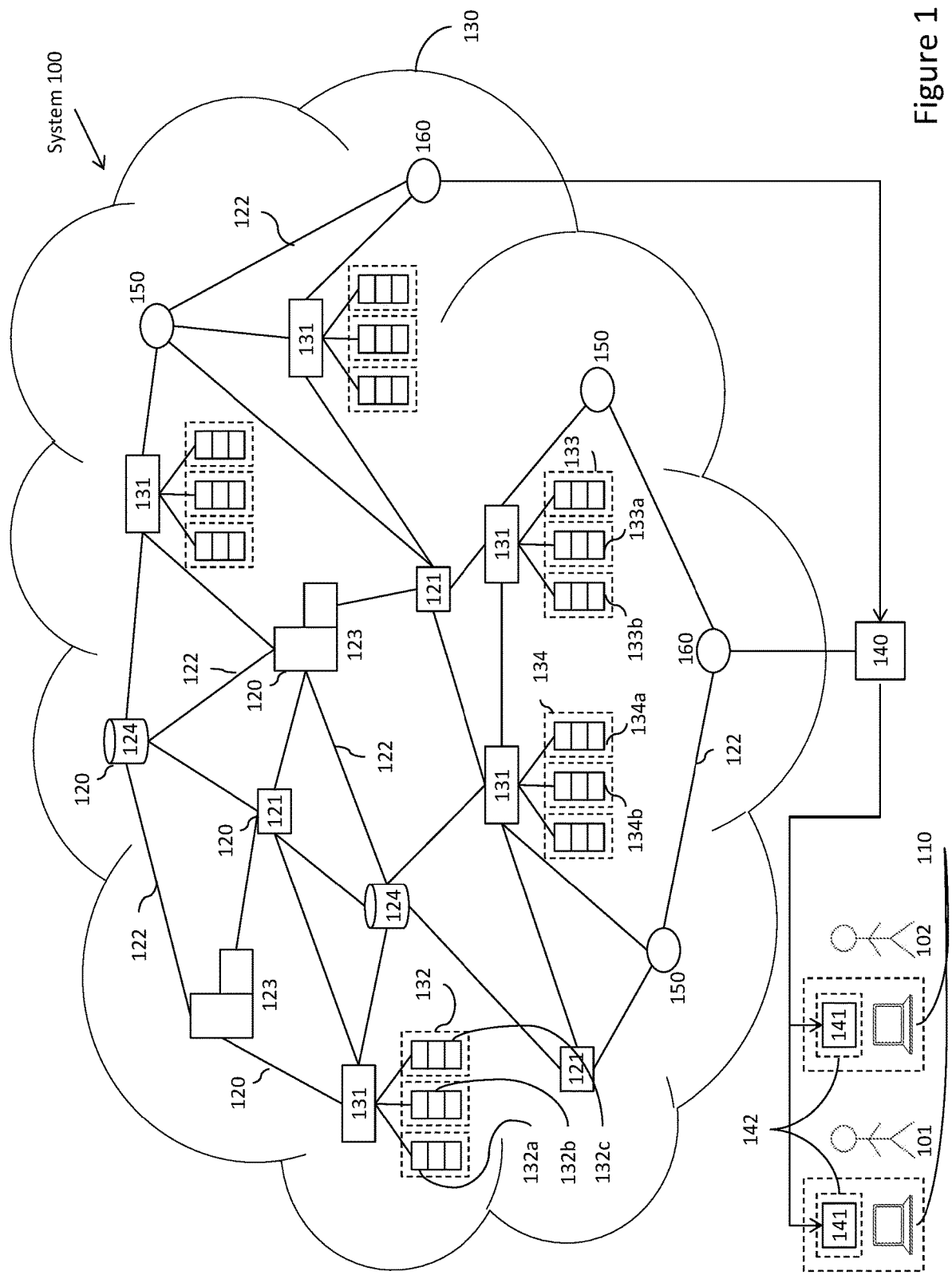
FIG. 1 (collectively including FIGS. 1A-1B) shows a conceptual drawing of a system.

Ideas and technologies shown or suggested by this Application should be thought of in their most general form, including without limitation, considering one or more of the following:

The phrases and terms "Application," "this Application," "this Disclosure," and variants thereof, generally refer to this Specification, Drawings, Figures, and Claims, all other parts of this Application, and all facts known in the art at the time of filing, and all facts that can be rationally concluded therefrom.

The phrases and terms "disposed," "disposed for," "disposed to," and variants thereof, generally refer to the possibility that a particular element, collection of elements, portion of an element, or linkage between or among elements, is capable of (and optionally, well suited to) performing the described activity. For example, if an element is said to be "disposed to lift" a user, this generally refers to a capability or disposition (including positioning, orientation, or coupling) of the object.

When an apparatus element or a method step is said to "include" or "perform," and variants thereof, or otherwise be restricted in some way, this Application should be read that the subpart of the apparatus element, or the sub-step of the method, and the restriction mentioned, is only optional, not required. After reading this Application, those skilled in the art will recognize that those apparatus elements or method steps need not necessarily include or perform those particular subparts or sub-steps. In the context of the invention, no such particular subparts or sub-steps are particularly required. In an alternative embodiment, apparatus elements or method steps without those sub-parts or sub-steps would be workable, are within the scope and spirit of the invention, and would not require undue experiment or further invention.

The phrases and terms "in one example," "in one embodiment," "in one implementation," "in one scenario," "in possible examples," "in possible embodiments," "in possible implementations," "in possible scenario," and variants thereof, generally refer to the possibility that a particular characteristic, feature, or structure, described herein is included in at least one possible embodiment of the invention. Multiple uses of this phrase do not necessarily all refer to the same possible embodiment. Rather, the specific particular characteristic, feature, or structure, described herein might be combined in any suitable manner into one or more distinct possible embodiments.

The phrases and terms "perform," and variants thereof, generally refer (in the context of a program of instructions) any one or more means by which those instructions are executed or interpreted, or a device (such as a computing device) otherwise conducts the process indicated by that program of instructions. A program of instructions can be detected or interpreted at one location, and executed or its process conducted at another location. A program of instructions can be performed by a portion of a device, rather than the entire device, or by one or more devices, or by one or more portions of devices (the same device or different devices). A program of instructions can be performed by an emulated device, such as a virtual machine, "sandbox" environment, or otherwise. A program of instructions can be performed in part, halted or paused or stopped, transferred to another device, in whole or in part, and possibly continued.

The phrases and terms "relatively," and variants thereof, generally refer to any relationship in which a comparison is possible, including without limitation "relatively less," "relatively more," and otherwise. In the context of the invention, where a measure or value is indicated to have a relationship "relatively," that relationship need not be precise, need not be well-defined, and need not be by comparison with any particular or specific other measure or value. For one example, whenever a measure or value is "relatively increased" or "relatively more," that comparison need not be with respect to any known measure or value, but might be with respect to a measure or value held by that measurement or value at another place or time, or with respect to a measure or value commonly used in the art.

The phrases and terms "substantially," and variants thereof, generally refer any circumstance in which a determination, measure, value, or otherwise; is equal, equivalent, nearly equal, nearly equivalent, or approximately; what the measure or value is recited to be. For example, the phrases and terms "substantially all," and variants thereof, generally refer to any circumstance in which all, except possibly a relatively minor amount or number, have the stated property. For example, the phrases and terms "substantially none," and variants thereof, generally refer any circumstance in which none, except possibly a relatively minor amount or number, have the stated property. For example, the phrases and terms "substantial effect," and variants thereof, generally refer any circumstance in which an effect might be detected or determined.

The phrases and terms "techniques," and variants thereof, generally refer to any material suitable for description, including without limitation all such material within the scope of patentable subject matter. Whenever a method step is described, those skilled in the art would know, without further invention or undue experiment, that this application thereby also describes (1) at least a first product, such as one maintaining instructions that are interpretable by a computing device, where those instructions direct one or more devices to perform that method step; and (2) at least a second product, such as one capable of performing that method step.

Specific Phrases and Terms

One or more of the following phrases and terms can be used in this Application. Where clear from the context, they can have the meanings described herein. After reading this Application, those skilled in the art would recognize that these phrases and terms can have other, broader and further, meanings as well or instead.

Ideas and technologies shown or suggested by, or specific to, this Application should be thought of in their most general form, including without limitation, considering one or more of the following:

The phrases and terms "elements," and "parameters," and variants thereof, generally refer (in the case of elements) to real or virtual devices or other resources available to operators or users coupleable to the monitoring environment. For example, the phrases and terms "elements," and variants thereof, can refer to real or virtual storage resources. These phrases and terms generally refer (in the case of parameters) to values associated with those elements, such as, in the case of storage devices, the amount of space they have available for use.

The phrases and terms "division of elements," and "separation of elements," and variants thereof, generally refer to division or separation of elements in the monitoring environment into subsets that are to be separately monitored or processed by computing devices, and are to have the monitoring or processing results unified by the unification devices. As described in this Application, division or separation of elements need not require the subsets to be disjoint, and need not require the subsets to cover all elements in the monitoring environment.

The phrases and terms "monitoring or processing," and "monitoring or processing results," and variants thereof, generally refer to results determined by computing devices assigned to subsets of the elements in the monitoring environment. As described in this Application, the monitoring or processing results are typically identified with particular time slots, such as from 1:01 to 1:02, but there is no particular requirement for any such limitation.

The phrases and terms "computing devices," in the context of "monitoring or processing," and variants thereof, generally refer to any device assigned to determine (by any means, not necessarily by computer processing) monitoring or processing results with respect to those elements.

The phrases and terms "unification," and "unification devices," and variants thereof, generally refer to the combination of multiple monitoring or processing results into a single unified result. For example, if the monitoring or processing results describe (for each computing device) an amount of storage space available for use by the elements assigned to that computing device, the unified result could include a total amount of storage space available for use by operators or users coupleable to the monitoring environment.

The phrases and terms "provision of alerts," and variants thereof, generally refer to indicators or signals, or otherwise, provided to operators or users, when alerting elements coupled to the monitoring environment determine that those indicators or signals are necessary or appropriate, or otherwise.

System Elements

System Overview

This Application primarily describes (1) separation of elements of the monitoring environment in particular ways, (2) monitoring or processing of devices in the monitoring environment in particular ways, (3) unification of monitoring or processing results from subsets of elements in particular ways, and (4) determination and provision of alerts to operators or users in particular ways. However, in the context of the invention, there are no particular requirements for any such limitations.

Alternative Techniques

For example, as described herein, alternative techniques could be used for any of the above procedures. These could include division or separation of elements; monitoring or processing of devices, elements, or parameters; unification; determination and provision of alerts; or otherwise. Techniques used therefor can be changed, even radically, from time to time. Moreover, techniques used for these operations can be deliberately changed from time to time, whether or not the monitoring environment appears to be working properly.

For example, these could include (1) alternative division or separation of elements of the monitoring environment in particular ways, (2) alternative monitoring or processing of devices in the monitoring environment in particular ways, (3) alternative unification of monitoring or processing results from subsets of elements in particular ways, (4) alternative determination and providing of alerts to operators or users, (5) combinations or conjunctions thereof, or otherwise.

For example, any one of these techniques could be (1) responsive to detectable changes in the monitoring environment, (2) responsive to periodic time durations, selected time durations believed to be correlated with use of the monitoring environment, (3) responsive to one or more of, or a count or frequency of, alerts or messages related to the monitoring environment, (4) responsive to instructions from operators or users, (5) responsive to deterministic, random, or pseudorandom effects, or otherwise.

Alternative Techniques for Division or Separation

For example, in alternative techniques separating the elements of the monitoring environment into distinct subsets, the subsets need not be identical, or even similar. Techniques for separating the elements of the monitoring environment into distinct subsets could operate differently for each resource or parameter to be monitored or processed, could operate individually or collectively, could use some combination or conjunction thereof, or otherwise.

For example, in assigning the elements of the monitoring environment to computing devices, each resource or parameter need not be monitored or processed by identical, or even similar, devices assigned to that resource or parameter. Each selected resource or parameter can be monitored or processed by (1) homogeneous or heterogeneous devices, (2) devices chosen with respect to that resource or parameter, or chosen without regard to that resource or parameter, (3) devices chosen using a deterministic technique, or a random or pseudorandom technique, (4) devices chosen for no particular reason at all, or some combination or conjunction thereof, or otherwise.

For example, in alternative possible implementations, each controller can allocate computing devices to each resource or parameter in response to a computed value that combines identifiers for more than one such element. For one example, each controller can allocate computing devices in response to a hash function or other function that combines the values in a selected tuple, such as the 5-tuple {sending device, output port, receiving device, input port, and application}; each controller can allocate computing devices in response to a relative locality, as measured by network topology, with respect to which elements provide or consume resources; or some combination or conjunction thereof; or otherwise.

Alternative Techniques for Monitoring or Processing

For example, in monitoring or processing each resource or parameter in the monitoring environment, techniques used to monitor or process those resources or parameters need not be uniform for each resource or parameter, or even uniform when monitored or processed by devices assigned to those resources or parameters. Each device assigned to a selected resource or parameter can use distinct, even completely different, techniques for monitoring or processing its assigned resource or parameter.

Alternative Techniques for Unification

For example, in unifying results of monitoring or processing for each resource or parameter, there is need for the same device to remain the unification device for the same resource or parameter. Each selected resource or parameter can be monitored or processed by unification devices that are (1) selected for the duration of use of the selected resource or parameter, (2) selected for a known duration, such as a duration determined at the time the resource or parameter is selected, (3) selected for a duration in response to one or more detected values of the parameter, such as whether the parameter falls outside or stays within a known range of values, (4) selected for a duration in response to a probability distribution or cumulative distribution of the parameter, such as whether the parameter remains consistent with an historical distribution of values, (5) periodically or aperiodically re-selected, with the effect of using new unification devices for each resource or parameter from time to time, or some combination or conjunction thereof, or otherwise.

For example, in unifying results of monitoring or processing for each resource or parameter, there is no need for a unification device to be restricted to only a single resource or parameter. Each selected resource or parameter can be monitored or processed by unification devices that (1) operate in response to a single resource or parameter, (2) operate in response to more than a single resource or parameter concurrently or simultaneously, (3) operate in response to distinct resources or parameters at differing times, or some combination or conjunction thereof, or otherwise.

For example, in unifying results of monitoring or processing for each resource or parameter, there is no reason the unification device has to be a real device or element in the monitoring environment, as opposed to a virtual device. A unification device can include elements such as real or virtual processing elements (e.g., real devices or VMs), real or virtual storage elements, real or virtual VMIs or VMCIs, or some combination or conjunction thereof, or otherwise.

For example, in unifying results of monitoring or processing for each resource or parameter, techniques used to process results from devices assigned to those resources or parameters need not be identical, or even similar, when performed by unification devices. Unification devices can collect results from devices assigned to parameters (1) as they are received, or in response to selected threshold values, (2) periodically with a selected frequency, (3) aperiodically in response to random or pseudorandom factors, or some combination or conjunction thereof, or otherwise.

For example, in unifying results of monitoring or processing for each resource or parameter, techniques used to process results from devices assigned to those resources or parameters need not be identical, or even similar, when performed by unification devices. For example, unification devices could unify results from devices assigned to those parameters by (1) determining averages, maxima or minima, medians, sums, or other statistical computations for those parameters that might be relevant to the monitoring environment, (2) determining whether unified values for those parameters fall outside selected thresholds that might be relevant to the monitoring environment, (3) determining whether those unified values have probabilistic distributions or cumulative distributions, whether measured over a relatively longer or shorter duration, that differ from distributions that might be relevant to the monitoring environment, or some combination or conjunction thereof, or otherwise.

As described in this Application, unification devices can use any other substantially unique identifier, or even only approximately unique identifiers, to identify reports from computing devices that are responsive to similar states of the monitoring environment. This can have the effect that unification devices can determine when reports from computing devices can be substantially relied upon for unification, so as to provide a relatively global report of the monitoring environment. This can also have the effect that unification devices can determine when reports from computing devices are substantially distinct, with the effect that they cannot be reliably unified. This can occur, for example, when those reports are responsive to differing time durations, or when they are responsive to differing measures of resources or parameters, or some combination or conjunction thereof, or otherwise.

For some examples, elements of the monitoring environment can be assigned to computing devices in such manner (1) as would be relatively convenient for monitoring of resources or processing of their parameters, (2) as would be relatively convenient for delivery of the results of monitoring or processing to unification devices, (3) as would be relatively consistent with a network topology or resource load, which could itself be possibly time-varying in response to resource usage, or some combination or conjunction thereof, or otherwise.

For some examples, elements of the monitoring environment can be assigned to computing devices, in response to (1) relatively unequal resource or parameter effect on the monitoring environment, (2) specific or implied instructions from operators or users, (3) one or more types of unified information about the monitoring environment, (4) random or pseudo-random effects, (5) urgent or otherwise emerging changes in the monitoring environment, or some combination or conjunction thereof, or otherwise.

Alternative Techniques for Determining and Providing Alerts

For example, in determining whether results of monitoring or processing for each resource or parameter might be relevant to the monitoring environment, unification devices need not compare those results with, or measure those results against, identical, or even similar, aspects of the monitoring environment. For example, unification devices could (1) compare or measure those results with respect to databases or formulae that differ for each parameter, (2) employ additional hardware or software elements with respect to each parameter, (3) compare or measure those results with respect to differing aspects of the monitoring environment, (4) combine those results in response to differing aspects of the monitoring environment, or some combination or conjunction thereof, or otherwise.

For example, in providing results of monitoring or processing for each resource or parameter, there is no need for reporting devices to use identical, or even similar, techniques for reporting those results. Reporting devices, which might be the same as or called upon by unification devices, can raise alarm signals, make telephone calls, send email messages, send text messages (e.g., SMS or MMS), post messages to social networks, or some combination or conjunction thereof, or otherwise.

System Elements

A system includes elements as shown in the figure, including at least those elements described in this Application. In possible implementations, those elements could include the elements described below with respect to element identifiers. In alternative possible implementations, those elements could include other elements necessary, appropriate, or desirable to perform functions that are described herein.

Elements could comprise single devices, portions of devices, combinations of multiple devices, combinations of devices with portions of other devices, combinations or conjunctions thereof, or otherwise. After reading this application, those skilled in the art would recognize many possibilities, not necessarily specifically described in this application, that could be used in possible implementations, or that could be employed while using one or more of those possible implementations.

Element Identifiers

System elements and sub-elements are sometimes described herein with respect to the following reference numbers and/or names:

100—system
101—operator(s)
102—user(s)
110—operator/user stations
120—network service devices
121—connectivity servers (routers/switches)
122—connectivity elements (connections)
123—computation servers
124—storage servers
130—network monitoring environment
131—network monitoring devices
132—user-related silos
132a—user information
132b—user identities
132c—user identity groups
133—services-related silos
133a—services information
133b—interfaces (e.g., VMIs, VMCIs)
134—storage-related silos
134a—storage controllers
134b—storage volumes
140—alerting devices
141—alerting user interfaces (UI)
142—monitoring user interfaces (UI)
150—monitoring computing devices
160—monitoring unification devices These elements and subelements are generally referred to herein as appearing in one or more of the figures. They could appear in any subfigure, or multiple subfigures, of any one or more of the figures. The location of particular elements and sub-elements would be obvious to one of ordinary skill in the art, without undue experiment or further invention. In the context of the invention, there is no particular requirement for any particular limitation derived therefrom.

Network Service Elements

FIG. 1 shows a first conceptual drawing of a system.

Nature of Network Service Elements

A system 100 could be coupled to one or more operators 101 (not part of the system 100) or users 102 (not part of the system 100). The operators 101 and users 102 could couple to one or more operator/user stations 110, and could use those operator/user stations 110 to obtain one or more services from network service devices 120.

Network service devices 120 could include one or more connectivity servers 121, such as routers and switches, and network connectivity elements 122, such as connections between and among routers and switches. Network connectivity elements 122 could also include multiple-access connectivity elements, such as wireless communication.

Network service devices 120 could also include one or more computation servers 123, such as physical servers, hypervisors, and VMs. Physical servers could cooperate to operate collectively, such as when multiple processors provide processing resources under control of a multi-processor OS (operating system). The multi-processor OS can serve as a host OS, executing a hypervisor to emulate one or more VMs (virtual machines) or other processing containers. In possible implementations, each VM includes a guest OS that is controlled by the hypervisor. In possible implementations, each guest OS could control one or more application servers. In possible implementations, each application server can provide computation resources (in the form of the particular application implemented by that application server).

Network service devices 120 could also include one or more storage servers 124, such as physical SAN (storage attached network devices), virtual SAN (devices emulating physical SAN), direct access storage, or otherwise.

Monitoring and Processing of Network Service Elements

As described above, the network resources, or parameters thereof, might be responsive to relatively many distinct types of these types of network elements, both real and abstract. For example, for computing resources, some such elements might include virtual machines (VMs), applications being performed on those VMs, VM interfaces (VMIs) being presented by those applications and VMs, VM communication interfaces (VMCIs) used to interface with those VMIs, and otherwise.

These elements might themselves be responsive to (or responsible for) other resources that they might consume (or generate), whether real or virtual. For example, for networking resources, some such resources, or parameters thereof, might include network bandwidth and network flows used by those VMs, real or virtual processors and processor time, real or virtual storage elements and storage space, and otherwise.

As described herein, a network monitoring environment 130 can be responsive to the network service devices 120, or can be responsive to parameters thereof. For example, the network monitoring environment 130 can include network monitoring devices 131 that provide information with respect to operation of the network 110. For example, the network monitoring devices 131 can provide information with respect to operation of the network 110 in one or more silos, such as user-related silos 132, services-related silos 133, or storage-related silos 134. Each such silo can include information with respect to monitoring of that class of resources, such as availability and usage, provided by the network 110.

For example, user-related silos 132 can include information with respect to users, including user information 132a (information about particular users), user identities 132b (identities of those particular users), and user identity groups 132c (information about groups of users, such as a group of users having a particular access class or priority, e.g., accounting users or engineering users). For another example, services-related silos 133 can include information with respect to services, including services information 133a (information about particular services), services identities 133b (identities of those particular services), and services identity groups 133c (information about groups of services, such as a group of services having particular priority associated therewith, e.g., external communication bandwidth). For another example, storage-related silos 134 can include information with respect to storage, including information about storage controllers 134a and storage volumes 134b. Other examples can include silos with respect to communication bandwidth, VM communication interfaces, and other resources possibly made available by the network 110.

Issues Re Monitoring and Processing of Resources and Parameters

The distributed monitoring environment could also be subject to relatively rapid changes in allocation, demand, supply, or other use factors regarding resources or parameters of the network. The monitoring environment might also be subject to relatively complex interactions between those changes, with the possible effect that informing operators or users of problems in the distributed network might be computationally difficult, probabilistically uncertain, or otherwise unclear. This possible effect might apply to developing problems; extant problems, which might be hidden by other operational issues; excess or improperly distributed demand; malware attacks; software errors; or other possible problems.

As further described herein, the network monitoring devices 131 can provide one or more alerts to alerting devices 140, which can provide those alerts to the operator/ user stations 110, which can provide those alerts to the operators 101 or users 102. In one embodiment, the alerting devices 140 can provide those alerts using one or more alerting user interfaces (UI) 141, which can be included in one or more monitoring user interfaces (UI) 142 available to the operators 101 or users 102. In one embodiment, alerts can include "ordinary" alerts, such as an indicator that a network function is out of a selected bound. Examples can include that computational resources or storage resources are overtaxed. In one embodiment, alerts can also include "alert storms", such as an indicator that an excessive number of alerts are being generated with respect to one or more network monitoring functions. Examples can include that computational resources and storage resources are collectively generating too many alerts because attempts to free storage resources are using excess computational resources or vice versa.

Network Monitoring and Processing

In one possible implementation, the system 100 could include a network monitoring environment 130 having network monitoring devices 131, as further described herein. The network monitoring devices 131 can each be coupled to one or more selected monitoring computing devices 150, each of which can collect information provided by the network monitoring devices 131 and provide computed results in response thereto. For example, a set of network monitoring devices 131 can each provide information with respect to use of computational resources, storage resources, computational bandwidth resources, or other resources. In response thereto, the monitoring computing devices 150 can collect that information and provide a summary of use of computational resources, storage resources, computational bandwidth resources, or other resources.

As further described herein, each network monitoring device 131 can be coupled to one or more such monitoring computing devices 150, each of which can provide a computed result with respect to resource usage in response thereto. As further described herein, distinct monitoring computing devices 150 can each provide distinct computed results. For example, a first such monitoring computing device 150 can provide a substantially instantaneous sum of resource usage in a portion of the network monitoring environment 130, while a second such monitoring computing device 150 can provide an average of resource usage, over a selected time duration, for all or a portion of the network monitoring environment 130.

As further described herein, one or more of the network monitoring devices 131, or the monitoring computing devices 150, can be coupled to one or more monitoring unification devices 160. This can have the effect that information from the network monitoring devices 131 or the monitoring computing devices 150 can be collected by the monitoring unification devices 160 and there unified. For example, if a selected set of network monitoring devices 131 each provides a report of computational usage at one or more selected computing devices, one or more monitoring computing devices 150 coupled thereto can (in response thereto) provide a report of total computational usage at those selected computing devices, and one or more monitoring unification devices 160 can each provide a report of total computational usage for all of, or a portion of, the network monitoring environment 130. For another example, in response to similar information from network monitoring devices 131 and monitoring computing devices 150, one or more monitoring unification devices 160 can each provide a report of an average computational usage for all of, or a portion of, the network monitoring environment 130.

As further described herein, the monitoring unification devices 160 can be coupled to one or more of the alerting devices 140, which can (in response thereto) provide one or more alerts to the operator/user stations 110 and to the operators 101 or users 102.

Division and Unification of Network Monitoring and Processing

As described herein, techniques for network monitoring and processing could include one or more of:

(1) dividing the network monitoring environment 130 in the system 100 into multiple subsets of network service devices 120 and parameters provided in response thereto;

(2) assigning the divided network service devices 120 and/or their parameters to one or more network monitoring devices 131 and/or one or more monitoring computing devices 150;

(3) performing monitoring and/or processing techniques with respect to the assigned network service devices 120 and/or parameters at each of the network monitoring devices 131 and/or monitoring computing devices 150;

(4) sending one or more results of those performed monitoring and/or processing techniques to the monitoring unification devices 160;

(5) performing unification of those one or more results at each of the monitoring unification devices 160;

(6) sending the results of those performed unification techniques to the alerting devices 140;

(7) performing determination of whether alerts are appropriate at each of the alerting devices 140;

(8) presenting alerts, at the alerting user interfaces 141 and/or the monitoring user interfaces 142, to the operators 101 or users 102 when such alerts are determined to be appropriate; and (9) other and further steps as could be necessary, appropriate, desirable, or otherwise.

Method of Use

FIG. 2 shows a conceptual drawing of a method.

In possible implementations, a method 200 includes flow points and method steps as described herein, other elements shown in the figure, and possibly other elements. Not all flow points or method steps are required. Flow points or method steps should be considered optional, unless otherwise specified or unless clearly obvious for operation of the system.

The system 100, or portions of the system 100, can be used while performing the method 200, or portions of the method 200. Where described herein that a flow point is reached, or a step is performed, by the method 200, it should be understood from the context, or from the figure, which portions (or all of them) of the system 100, reaches the flow point or takes the actions to perform the step.

Although the nature of text necessitates that the flow points and steps are shown in a particular order, in the context of the invention, there is no reason for any such limitation. The flow point may be reached, and the steps may be performed, in a different order, or may be performed by co-routines or recursive functions, or may be performed in a parallel or pipelined manner, or otherwise.

Flow Points and Method Steps

Ready to Start

A flow point 200A indicates that the method 200 is ready to start.

In possible embodiments, the method 200 could start in response to one or more of the following triggering effects:

initialization of the system 100, the distributed network 110, or a selected portion thereof;

initialization of a network monitoring environment 130 for the distributed network 110, or a selected portion thereof;

changes to the distributed network 110, the network monitoring environment 130, or a selected portion thereof, possibly including one or more of: (1) addition of resources; (2) modification of resources; (3) removal of resources; (4) addition of parameters to one or more resources; (5) modification of parameters with respect to one or more resources; (6) removal of parameters from one or more resources; (7) modification of connectivity of the network 110, the network monitoring environment 130, or a selected portion thereof; (8) modification of use of the network 110, the network monitoring environment 130, or a selected portion thereof;

instructions from operators 101 or users 102, or a selected group thereof;

restart of the method 200 after termination thereof, such as described herein with respect to the flow point 200B;

combinations or conjunctions thereof, or otherwise.

At a step 201, the method 200 could perform initialization operations. These initialization operations can include one or more of:

allocating storage space for instructions to be executed or emulated by the method 200, or by elements of the network 110;

allocating storage space for variables to be used with the method 200;

determining one or more resources to be monitored using the method 200;

assigning one or more parameters to resources to be monitored using the method 200;

assigning, computing, or otherwise determining, such as possibly in response to pseudorandom or random effects, values for parameters assigned to be monitored;

combinations or conjunctions thereof, or otherwise.

Separation, Unification, and Otherwise

At a flow point 210, the method 200 is ready to separate elements of the network monitoring environment 130 into subsets (distinct or otherwise). As described above, this can have the effect that each subset of elements could be monitored or processed separately, such as by a separate controller (whether that controller includes a network service device 120, a network monitoring device 131, a monitoring computing device 150, or otherwise). However, in the context of the invention, there is no particular requirement for any such limitation. For example, the selected subsets can overlap, fail to include all elements of the network monitoring environment 130, change with time, or otherwise fail to be distinct or even explicitly distinct.

As described above, each such controller (whether that controller includes a network service device 120, a network monitoring device 131, a monitoring computing device 150, or otherwise) could include one or more computing devices, such as either operating separately or in cooperation. These one or more computing devices could include devices capable of operating under the direction of instructions to measure, compute, otherwise determine, or some combination or conjunction thereof, parameters of interest. These parameters of interest could be used by the system 100 to determine status of the network, to determine whether that status warrants correction, to determine whether that status warrants informing operators or users, combinations or conjunctions thereof, or otherwise.

At a step 211, the method 200 assigns each element in the network to one or more of those computing devices, such as one or more network service devices 120. For one example, a first computing device could be assigned elements in the network of a particular type (whether real or virtual), such as network connections, storage elements, processing devices or VMs, VMIs, or VMCIs. For another example, a second computing device could be assigned parameters associated with elements in the network (whether or not those elements are substantially identical or distinct).

Some parameters might be applicable to disparate elements, such as percent of usage, maximum or minimum usage in a known time duration (e.g., in the past 1-2 minutes), and otherwise. Some parameters might be applicable only to substantially identical elements, such as available storage capacity (for storage devices), processing wait time (for processing devices), communication bandwidth, and/or otherwise. Some parameters might be partially applicable for some types of disparate elements and for other types of substantially identical elements, such as parameters relating to statistical features (e.g., rates of change, standard deviations, and otherwise), whether statistical features of particular parameters or statistical features of the network monitoring environment 130.

At a step 212, the method 200 directs each such computing device to monitor or process the parameters it has been assigned, for those elements it has been assigned. As part of this step, each particular computing device collects information from those elements it has been assigned, sufficient to allow that particular computing device to determine a monitoring value (or a processed value in response to monitoring values). Also as part of this step, each particular computing device uses the information it collects to determine that monitoring value or processed value, such as by executing or interpreting instructions to make that determination.

At a step 213, the method 200 directs each such computing device to send its monitoring or processing results to unification devices assigned to its subset of elements in the monitoring environment. In possible implementations, there is a single unification device for each subset of elements; however, in the context of the invention, there is no particular requirement for any such limitation.

For example, in some possible implementations, selected sets of computing devices could each send their results to an associated group including a relatively small number of unification devices. Each one of that group could determine a separate unified result, and that group could use those separate unified results to collectively determine a single unified result. In one such example, a relatively small number of unification devices could each determine a stochastic unified result, and the group of unification devices could select one or more of those stochastic unified results in response to a pseudorandom or random effect.

For example, in possible implementations, computing devices could have each element assigned to multiple subsets, in response to particular parameters assigned to those elements. For example, in the case of storage elements, each such element could have separate parameters for (1) space available, (2) percent of total space available, (3) reading and writing latency, (4) recent bit error rate, and otherwise. In such cases, those storage elements could each be assigned to as many as four separate subsets, each of which could be assigned to a separate computing device, each of which could determine a separate monitoring or processing result, each set of which could be separately unified by a (possibly) separate unification device.

At a step 214, the method 200 directs each unification device to receive monitoring or processing results from its assigned computing devices. As noted above, each unification device receives monitoring or processing results from computing devices assigned to a subset of elements in the monitoring environment, and provides a unified result collectively valid for the entire monitoring environment.

At a step 215, the method 200 directs each unification device to unify the monitoring or processing results into a unified result collectively valid for the monitoring environment. In a possible implementation, the unification device performs operations to combine the results it receives into the single monitoring parameter (or a relatively small number thereof) that serve the function of that unified result.

The method 200 proceeds with the flow point 220.

Allocation of Computing Devices and Unification Devices

At a flow point 220, the method 200 is ready to allocate computing devices and unification devices.

In a possible implementation, the method 200 determines substantially disjoint subsets of the elements (or element x parameter combinations) to selected unification devices. For example, the method 200 could allocate each element (or each element x parameter combination) to a particular subset in response to a pseudorandom or random effect, and could assign each subset to a particular unification device in response to a different pseudorandom or random effect.

In alternative possible implementations, the method 200 could select subsets that are not disjoint, or that do not collectively cover all the elements (or all the element x parameter combinations) in the monitoring environment. For example, the method 200 could determine for each element, in response to a pseudorandom or random effect, one or more subsets to which to assign that element. In such cases, the method 200 could also determine, for each subset, a limited number of elements in that subset for which monitoring or processing is applied by each computing device, with the effect that some element's parameters could be used by more than one computing device.

The method 200 proceeds with the flow point 230.

Unique Identification of Computing

At a flow point 230, the method 200 is ready to uniquely identify results of computing.

As described in this Application, each computing device assigned to a subset of elements in the monitoring environment could monitor or process parameters associated with those elements, to provide a result associated with that subset. The results associated with the subsets could be collected and unified by the unification devices.

In possible implementations, the unified results provided by the unification devices could be sent to alerting devices. The alerting devices could determine whether an indicator or alert should be provided to operators or users, in response to the indicator or alert, to the time sequence of values of that particular unified result, and in response to other effects or factors described in the Included Documents.

The method 200 proceeds with the flow point 240.

Re-Assignment of Computing and Unification

At a flow point 240, the method 200 is ready to re-assign computing and unification efforts.

In possible implementations, at a step 241, the method 200 could re-assign elements in the monitoring environment to different subsets. This step could be performed periodically, or in response to a triggering event, or aperiodically in response to a pseudorandom or random effect, or some combination or conjunction thereof, or otherwise.

In possible implementations, at a step 242, the method 200 could similarly re-assign different subsets to different computing devices. For example, the method 200 could move elements between or among computing devices in response to load balancing efforts, latency imposed by the computing devices, or non-monitoring load (i.e., load imposed by operators or users, other than for observing the monitoring environment, but rather for using the elements that are part of the monitoring environment), or in response to some combination or conjunction thereof, or otherwise.

In possible implementations, at a step 243, the method 200 could similarly re-assign different subsets to different unification devices. For example, the method 200 could rotate subsets among available unification devices, with the effect that load imposed by unification is balanced among those available unification devices.

The method 200 proceeds with the flow point 250.

Caching Computing and Unification

At a flow point 250, the method 200 is ready to cache computing and unification efforts.

In possible implementations, at a step 251, the method 200 could pre-calculate monitoring or processing results, such as in response to current values of element parameters for current subsets. For example, in the case of storage elements, the method 200 could pre-calculate read latency or write latency as a moving average over recent time. In such cases, if the monitoring or processing result is desired for the time duration from 1:01 to 1:02, and the computing device has determined a result for the time duration from 1:01:00 to 1:01:55, it is likely that not much additional processing would be involved to determine the moving average for the entire desired time duration.

In possible implementations, at a step 252, the method 200 could similarly precalculate unification results, such as in response to monitoring or processing results provided on the fly during the desired time duration. As described with respect to the just-earlier step, in such cases, if the unified result is desired for the time duration from 1:01 to 1:02, and at least some monitoring or processing results are available for a portion of that time duration, the unification device could pre-calculate the unified result. In such cases, as the time duration moves into the past, it is likely that not much additional processing would be involved to determine the unified result for the entire desired time duration.

The method 200 proceeds with the flow point 200B.

Method Completed

A flow point 200B indicates that the method 200 is ready to completed or finished, or otherwise unable to continue (such as in response to an unrecoverable error).

The method 200 could be restarted, in response to one or more of the triggering techniques described therein.

When the method 200 is restarted, the method 200 proceeds with the flow point 200A.

Alternative Embodiments

Individual elements or method steps of the described embodiments could be replaced with substitutes that perform similar functions in other contexts.

Elements of the system are described herein with respect to one or more possible perform similar functions. Moreover, as described herein, many individual elements of the described apparatuses are optional, and are not required for operation.

Moreover, although control elements of the one or more described apparatuses include more than one computing device (or more than one specialized computing device), not necessarily all similar, on which the element's functions are performed.

After reading this Application, those skilled in the art would recognize that many alternative techniques could be used, and that many variations of the techniques described herein, are within the scope and spirit of the invention, and would be workable without undue experiment or further invention.

The Claims in this Application are hereby included by reference in the text of the Specification.

The invention claimed is:

1. A method of monitoring a distributed computing system, the method comprising:
dividing a plurality of performance metric groups of a plurality of elements of the distributed computing system, each performance metric group indicating at least one parameter of a particular device function, at least one element of the plurality of elements of the distributed computing system providing a first performance metric and a second performance metric, the first performance metric being a member of a first performance metric group of the plurality of performance metric groups and the second performance metric being a member of a second performance metric group of the plurality of performance metric groups, each element of the plurality of elements of the distributed computing system being real or virtual;
for each performance metric group, assigning the performance metric group to a different controller of a plurality of controllers, each controller being a physical computing device of the distributed computing system, each physical computing device including a processor;
for each controller, monitoring at least one parameter of the assigned performance metric group over a time duration and storing information regarding the at least one para meter with a time value, the time value indicating a time when the at least one parameter was generated;

for each controller, providing the information and a related time value to a unification device;

aggregating, by the unification device, the information from the different controllers based at least in part on time values to create aggregated results;

determining if the aggregated results trigger an alert condition; and if the aggregated results trigger the alert condition, presenting the alert to an operator.

2. The method of claim 1, the method further comprising:
determining a separate unification result for each controller;
combining the separate unification results to provide the aggregated results; and
determining whether to present an alert to an operator or user in response to the separate unification result of one or more controllers.

3. The method of claim 2, wherein the separate unification result of one or more controllers is based on a selected particular type of element parameters.

4. The method of claim 2, wherein the separate unification result of one or more controllers is responsive to one or more silos of particular information with respect to the distributed computing system.

5. The method of claim 1, the method further comprising:
reassigning a particular performance metric group to the one of the plurality of unification devices in response to a change in one or more parameters associated with one of the plurality of elements of the distributed computing system.

6. The method of claim 1, the method further comprising:
reassigning one or more controllers to different performance metric groups in response to a change in the distributed computing system.

7. The method of claim 1, the method further comprising:
reassigning one or more performance metric groups to one or more different controllers in response to a change in one or more parameters.

8. The method of claim 1, wherein for each performance metric group, assigning the performance metric group to a different controller of the plurality of controllers comprises randomly assigning each of the performance metric groups to one of the controllers.

9. The method of claim 1, wherein different performance metric groups are used to monitor network bandwidth, processor time, storage space available, read latency, and write latency.

10. A system of monitoring, the system comprising:
a plurality of performance metric groups of a plurality of elements of a distributed computing system, each performance metric group indicating at least one parameter of a particular device function, at least one element of the plurality of elements of the distributed computing system providing a first performance metric and a second performance metric, the first performance metric being a member of a first performance metric group of the plurality of performance metric groups and the second performance metric being a member of a second performance metric group of the plurality of performance metric groups, each element of the plurality of elements of the distributed computing system being real or virtual;
a plurality of controllers, each of the plurality of performance metric groups being assigned to a controller of the plurality of controllers, each controller of the plurality of controllers being a physical computing device of the computing system, each physical computing device including a processor, each of the plurality of controllers being configured to monitor metrics of the performance metric group across elements of the distributed computer system over a time duration and storing information regarding the metrics of the performance metric group with a time value, the time value indicating a time when the at metrics of the performance metric group was generated; and
a unification device configured to receive the information and related time values from each of the plurality of controllers, the unification device configured to aggregate the information from the different controllers based at least in part on the time values to create aggregated results, the unification device configured to determine if the aggregated results trigger an alert condition, and if the aggregated results trigger the alert condition, present an alert to an operator.

11. The system of claim 10, wherein the unification device is further configured to:
determine a separate unification result for each controller of the plurality of controllers;
combine the separate unification results to provide the aggregated results; and
determining whether to present an alert to an operator or user in response to the separate unification result of one or more controllers.

12. The system of claim 11, wherein the separate unification result of one or more controller is based on a selected particular type of element parameters.

13. The system of claim 11 wherein the separate unification result of one or more controllers is responsive to one or more silos of particular information with respect to the distributed computing system.

14. The system of claim 10, wherein the unification device is further configured to reassign one or more controllers to different performance metric groups in response to a change in the distributed computing system.

15. The system of claim 10, wherein the unification device is further configured to reassign performance metric groups to one or more different controllers in response to a change in one or more parameters.

16. The system of claim 10, wherein each of the plurality of performance metric groups being assigned to a controller of the plurality of controllers comprises each of the plurality of performance metric groups being randomly assigned to different controllers.

17. A system comprising:
a processor; and
a memory storing instructions that, when executed by the processor, cause the processor to:
assigning each of a plurality of performance metric groups of a plurality of elements of a distributed computing system to at least one computing device of a distributed set of computing devices, each performance metric group indicating at least one parameter of a particular device function, at least one element of the plurality of elements of the distributed computing system providing a first performance metric and a second performance metric, the first performance metric being a member of a first performance metric group of the plurality of performance metric groups and the second performance metric being a member of a second performance metric group of the plurality of performance metric groups, each element of the plurality of elements of the distributed computing system being real or virtual, each computing device of the distributed set of computing devices capable of monitoring at least one element parameter of the assigned one of the plurality of performance metric groups;

monitor, by each computing device of the distributed set of computing devices, the at least one element parameter of the assigned one of the plurality of performance metric groups of the distributed computing system, the monitoring being based on a timestamp associated with the at least one element parameter of the assigned one of the plurality of performance metric groups of the distributed computing system, element parameters of the at least one element parameter including network bandwidth, processor time, storage space available, read latency, and write latency;

allocate a subset of the distributed set of computing devices to one of a plurality of unification devices of the computing system, the allocating being based on an allocation factor;

collect, by the one of the plurality of unification devices, one or more element parameters associated with the subset of the distributed set of computing devices;

unify, by the one of the plurality of unification devices, the collected one or more element parameters associated with the subset of the distributed set of computing devices, the unifying includes dividing the collected a particular element parameter of the one or more parameters into uniform duration based on a timestamp associated with the particular element parameter of each of the subset of the distributed set of computing devices; and present an alert to an operator in response to a result provided by one or more of the plurality of unification devices.

* * * * *